United States Patent [19]

Tomita et al.

[11] Patent Number: 4,542,430
[45] Date of Patent: Sep. 17, 1985

[54] TAPE RECORDER

[75] Inventors: Seiji Tomita, Yokosuka; Kaoru Morinaga; Yoshihiro Kotoda, both of Yokohama, all of Japan

[73] Assignee: Tokyo Shibaura Denki Kabushiki Kaisha, Japan

[21] Appl. No.: 419,601

[22] Filed: Sep. 17, 1982

[30] Foreign Application Priority Data

Nov. 25, 1981 [JP] Japan .................. 56-188892

[51] Int. Cl.⁴ .................. G11B 5/55; G11B 21/08
[52] U.S. Cl. .................. 360/106; 360/74.1; 360/78
[58] Field of Search .................. 360/74.1, 106, 78

[56] References Cited

U.S. PATENT DOCUMENTS

| | | |
|---|---|---|
| 3,575,422 | 4/1971 | Peltz . |
| 3,614,342 | 10/1971 | Siebert .................. 360/78 |
| 3,810,240 | 5/1974 | Nozawa . |
| 3,855,628 | 12/1974 | Bachmann .................. 360/106 |
| 4,238,808 | 12/1980 | Tomita . |
| 4,302,788 | 11/1981 | Yamamoto .................. 360/106 X |

FOREIGN PATENT DOCUMENTS

| | | |
|---|---|---|
| 4824531 | 7/1973 | Japan . |
| 4924412 | 7/1974 | Japan . |
| 1560745 | 10/1976 | United Kingdom . |
| 2086642 | 10/1981 | United Kingdom . |
| 2100053 | 5/1982 | United Kingdom . |

Primary Examiner—A. J. Heinz
Attorney, Agent, or Firm—Cushman, Darby & Cushman

[57] ABSTRACT

A tape recorder has a forward/reverse switching mechanism for switching between forward travel and reverse travel at normal speed, and a track switching mechanism for supporting a recording/playback head to be pivotal between positions where the recording/playback head is aligned with tracks of the tape in forward travel and reverse travel at normal speed. In response to the switching operation of the forward/reverse switching mechanism, a control lever is pivoted in one direction by a cam portion of a gear to selectively engage projections with projections of a driving shaft to rotate it in different directions. The track switching mechanism is driven by the drive slider which is slid in different directions upon movement of the driving shaft.

14 Claims, 16 Drawing Figures

TAPE RECORDER

BACKGROUND OF THE INVENTION

The present invention relates to a tape recorder which has a forward/reverse switching mechanism for switching between forward travel and reverse travel at normal speed and, more particularly, to an improvement in a mechanism for moving a head into a position corresponding to a track of the tape in accordance with the forward or reverse travel of the tape at normal speed.

In tape recorders, it is known that an automatic reverse (auto-reverse) mechanism makes it possible to perform reciprocal recording and playback. By using the automatic reverse mechanism, the preset conditions of the tape recording and the tape mounting condition need not be changed when the magnetic tape reaches its end in the forward direction of the tape travel, and the tape can be recorded and played back in the reverse direction. If the operator wishes to perform recording or playback for a relatively long period of time, the automatic reverse mechanism is vey convenient.

Further, in tape recorders which have recently become commercially available, logic circuits have been abundantly used. The tape recorder of this type has a plurality of feather-touch switches which are used to set a predetermined mode of operation and the stop mode. A solenoid plunger or the like which is used as an electric/mechanical converter is controlled by a control LSI (Large Scale Integration), so that various types of movable members of the mechanism are positioned to set the predetermined mode of operation and the stop mode in accordance with a button pressed by the operator. According to the tape recorder of the above type, since the feather-touch control buttons can be adopted, soft-touch operation can be realized. Only one LSI is required to drive the solenoid plunger corresponding to the pressed control button. Thus, the compact and lightweight tape recorder of this type can be manufactured at low cost, as compared with the conventional mechanical tape recorder.

However, in the tape recorder which includes a logic circuit and has the conventional automatic reverse mechanism, the overall arrangement is still complex and does not sufficiently provide an advantage of the logic circuit. Further, the tape recorder cannot be operated with high reliability and consumes much power. Therefore, a compact tape recorder which uses dry cells as the power source cannot be provided.

SUMMARY OF THE INVENTION

The present invention has been made in consideration of the above situation and has for its object to provide a compact tape recorder which has a simple mechanism for stably and smoothly moving a head into a position corresponding to a track of the tape in accordance with the forward or reverse travel of the tape at normal speed.

According to one aspect of the present invention, there is provided a tape recorder having a head for recording and playing back a tape, and a forward/reverse switching mechanism for switching from forward tape travel to reverse tape travel at normal speed and vice versa, characterized by comprising:

a track switching mechanism for supporting and moving the head between positions where the head corresponds to tracks of the tape in accordance with reverse tape travel and forward tape travel at normal speed; and a drive mechanism for moving the head into the position where the head corresponds to the track of the tape in accordance with one of reverse tape travel and forward tape travel at normal speed by driving the track switching mechanism in response to a switching operation of the forward/reverse switching mechanism.

DETAILED DESCRIPTION OF THE PREFERRED EMBODIMENT

Figure 1:
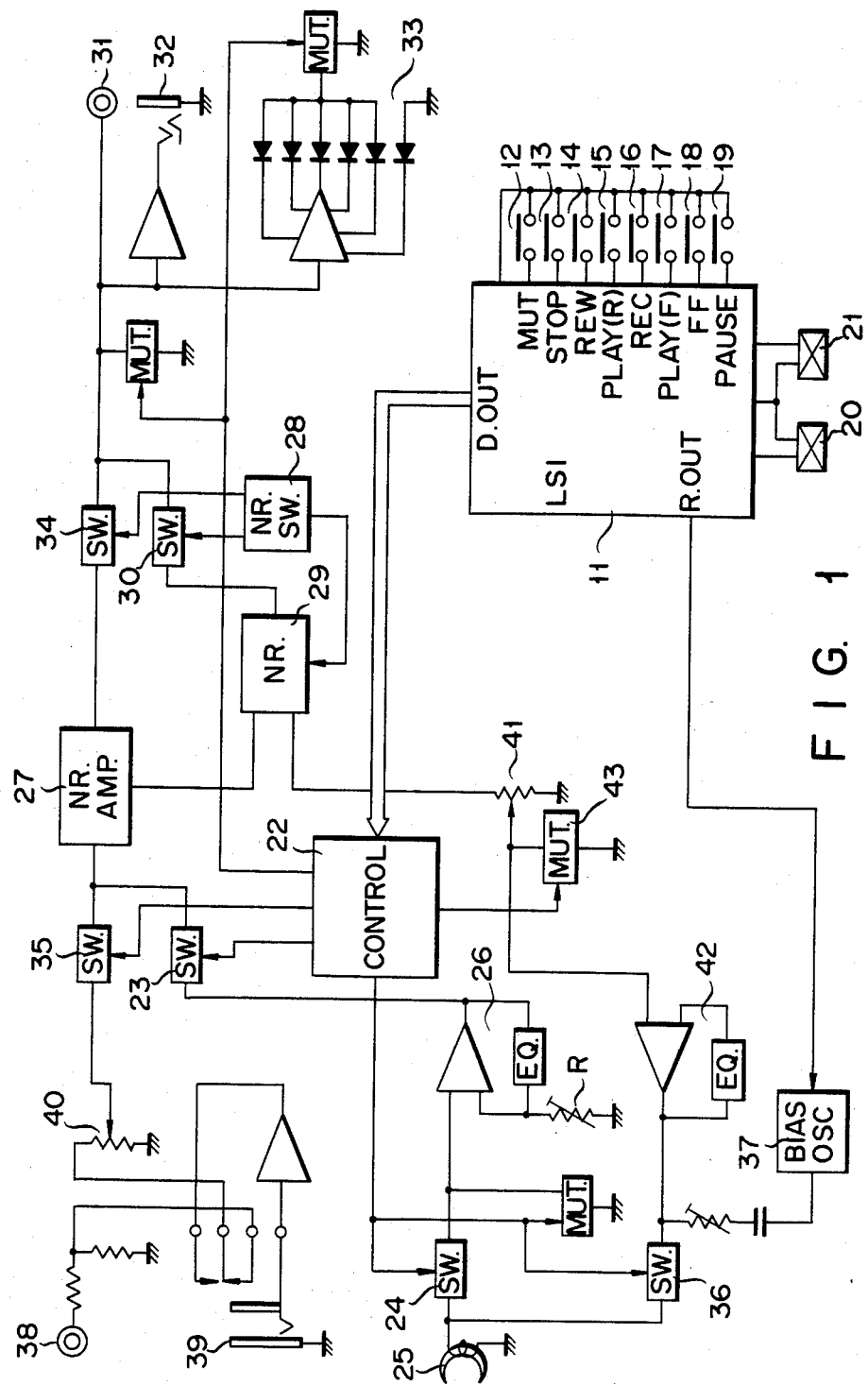
FIG. 1 is a block diagram showing the overall arrangement of a circuit of a tape recorder to which the present invention is applied.

A tape recorder according to an embodiment of the present invention will be described in detail with reference to the accompanying drawings. FIG. 1 is a block diagram showing the overall arrangement of the tape recorder circuit. Referring to FIG. 1, reference numeral 11 denotes an LSI for controlling the tape recorder. The LSI 11 has an MUT input terminal MUT for muting a recording signal, a STOP input terminal STOP for stopping the tape travel, an REW input terminal REW for rewinding the tape, a PLAY(R) input terminal PLAY(R) for playing the tape in the reverse direction, an REC input terminal REC for recording, a PLAY(F) input terminal PLAY(F) for playing the tape in the forward direction, an FF input terminal FF for fast forwarding the tape, and a PAUSE input terminal PAUSE for temporarily stopping the tape travel. These input terminals MUT, STOP, REW, PLAY(R), REC, PLAY(F), FF and PAUSE are respectively connected to an MUT switch 12, a STOP switch 13, an REW switch 14, a PLAY(R) switch 15, an REC switch 16, a PLAY(F) switch 17, an FF switch 18 and a PAUSE switch 19. These switches 12 to 19 are feather-touch switches. When the operator presses one of the switches 12 to 19, the corresponding one of the input terminals MUT, STOP, REW, PLAY(R), REC, PLAY(F), FF, and PAUSE reaches a high level. The LSI 11 produces a code signal corresponding to the input terminal of high level (to be referred to as an H level hereinafter) from a data output terminal D.OUT. In this case, once the LSI 11 produces the code signal from the data output terminal D.OUT, it electrically holds the code signal. Even when the operator releases the depressed one of the switches 12 to 19, the code signal is continuously generated.

Assume that the operator presses the REW switch 14 or the FF switch 18. The LSI 11 then produces a code signal corresponding to rewinding or fast frowarding. The code signal is supplied to a solenoid plunger (not shown) which drives a high speed tape drive mechanism (not shown) arranged in a tape recorder mechanism to be described later. The tape recorder mechanism is controlled to rewind the tape or fast forward it.

When the operator presses either the PLAY(F) switch 17 or the PLAY(R) switch 15 or both, the LSI 11 produces a code signal corresponding to playback. Solenoid plungers 20 and 21 are then powered to drive a head moving mechanism and a head rotating mechanism (to be described later) of the tape recorder mechanism. Thus, the tape recorder mechanism is controlled to drive the tape in the forward or reverse direction. In other words, the tape recorder mechanism has a forward/reverse switching mechanism to drive the tape at normal speed in the forward or reverse direction. The forward/reverse switching mechanism will be described in further detail later on. Although a conventional tape recorder which performs recording or playback in the forward direction requires one PLAY switch, a tape recorder which has the automatic reverse mechanism must perform recording and playback in the forward and reverse directions and requires two PLAY switches. If the operator presses or touches one of the two PLAY switches, playback (or recording) in a direction selected by the corresponding PLAY switch is performed. However, when the operator presses or touches the two PLAY switches at the same time, the automatic reverse mode is set. Therefore, if the operator wishes to perform playback (or recording) in the forward direction, he presses or touches only the corresponding one of the switches.

The code signal produced by the LSI 11 in a condition where the operator presses either the PLAY(F) switch 17 or the PLAY(R) switch 15, or both is supplied to a control circuit 22. The control circuit 22 turns on switching circuits 23 and 24 in response to the code signal. A playback signal reproduced at a recording/playback head 25 shown in FIG. 1 is supplied to a noise reduction amplifier circuit 27 through the switching circuit 24, a playback equalizer circuit 26 and the switching circuit 23.

If the operator presses a noise reduction switch 28, a noise reduction circuit 29 and a switching circuit 30 are ON. The playback signal amplified by the noise reduction amplifier circuit 27 is supplied to an external output terminal 31 and a headphones jack 32 through the noise reduction circuit 29 and the switching circuit 30. The playback signal is also supplied to a level indicator circuit 33. However, when the noise reduction switch 28 is OFF, a switching circuit 34 is ON. The playback signal amplified by the noise reduction amplifier circuit 27 is then supplied to the external output terminal 31, the headphones jack 32 and the level indicator circuit 33 through the switching circuit 34. The playback level is controlled by a variable register R connected to the playback equalizer circuit 26.

When the operator presses the REC switch 16 together with one of the PLAY(F) and PLAY(R) switches 17 and 15 or both, recording in either the forward or reverse direction or automatic reverse recording can be performed. In this case, the mode of operation of the tape recorder mechanism is the same as that in playback, but the operation of the circuit shown in FIG. 1 in the recording mode is different from that in the playback mode. When the operator presses the REC switch 16 and one of the PLAY(F) and PLAY(R) switches 17 and 15 or both, the LSI 11 energizes the solenoid plungers 20 and 21 and produces a corresponding code signal from the data output terminal D.OUT.

In response to the code signal, the control circuit 22 controls switching circuits 35 and 36 in FIG. 1 which are turned on. When the operator presses the REC switch 16, the LSI 11 produces a signal for driving a bias oscillator circuit 37 from a recording output terminal R.OUT. Therefore, if the noise reduction switch 28 is ON, the recording signal supplied to an external input terminal 38 or an external microphone jack 39 is superposed on an output signal from the bias oscillator circuit 37 through a recording volume control 40, the switching circuit 35, the noise reduction amplifier circuit 27, the noise reduction circuit 29, a recording level control 41 and a recording equalizer circuit 42. The recording signal is then supplied to the recording/playback head 25 through the switching circuit 36. In this case, an output from the noise reduction circuit 29 is supplied to the external output terminal 31, the headphones jack 32 and the level indicator circuit 33 through the switching circuit 30 so as to monitor the recording level.

If the noise reduction switch 28 is OFF, the noise reduction circuit 29 is not driven. The recording signal amplified by the noise reduction amplifier circuit 27 passes through the noise reduction circuit 29. Noise reduction is thus not performed and the recording signal is supplied to the recording level control 41. In this case, the recording signal amplified in the noise reduction amplifier circuit 27 is supplied to the external output terminal 31, the headphones jack 32 and the level indicator circuit 33 through the switching circuit 34. Thus, the recording level can be monitored.

In the above recording state, when the operator presses the MUT switch 12, the LSI 11 produces a code signal which corresponds to depression of the MUT switch 12 to the control circuit 22. The control circuit 22 then drives the muting circuit 43, so that the recording signal whose level is controlled by the recording level control 41 is grounded. It will be noted that muting is performed only for the duration in which the MUT switch 12 is being pressed.

When the operator presses the PAUSE switch 19 once, the LSI 11 produces a code signal to temporarily interrupt the playback condition of the tape recorder mechanism. When the PAUSE switch 19 is pressed again, playback is resumed.

Upon depression of the STOP switch 13, the LSI 11 produces a code signal to interrupt any operation set by other switches 12 and 14 to 19. Simultaneously, the tape recorder mechanism is set in the stop mode.

Figure 2:
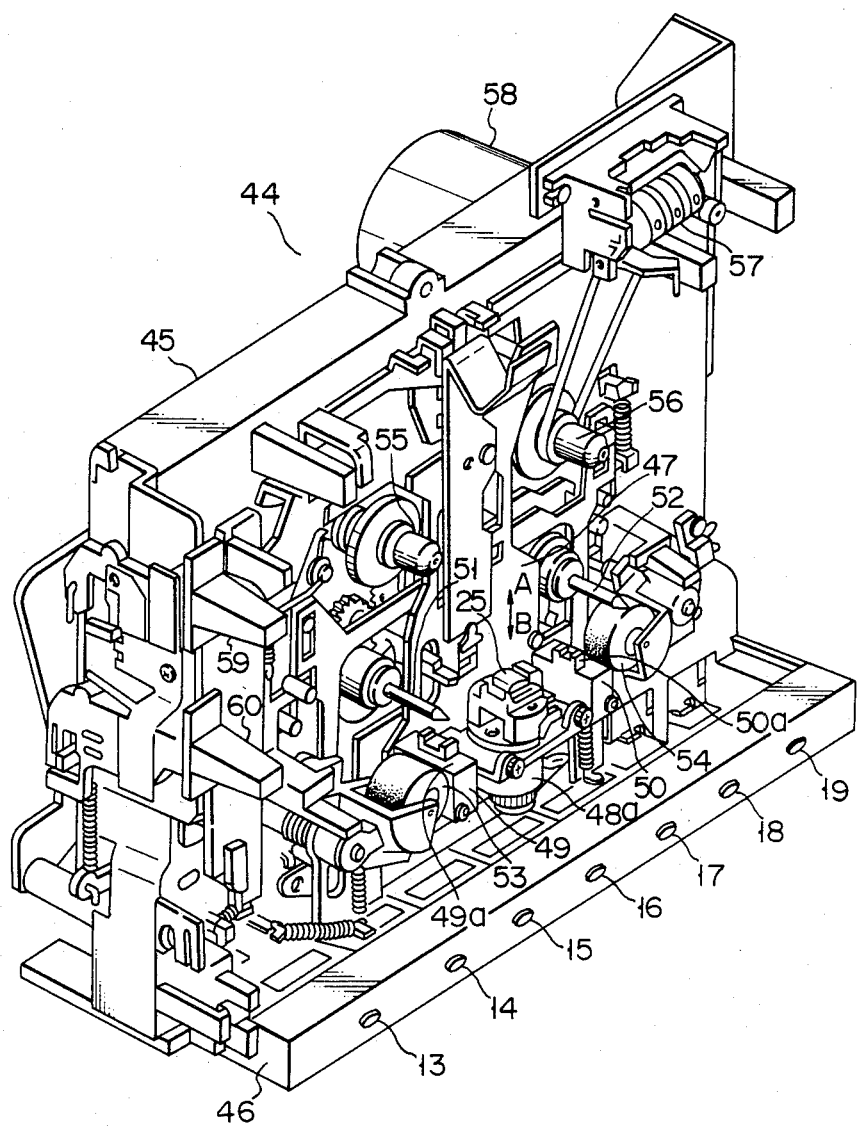
FIG. 2 is a schematic perspective view of a tape recorder mechanism of a tape recorder according to an embodiment of the present invention.

FIG. 2 is a perspective view of a tape recorder mechanism 44. Reference numeral 45 denotes a substantially box-shaped main chassis of a compact cassette tape recorder. Various types of mechanisms to be described later are disposed at the front, rear, upper, lower, right and left portions of the tape recorder mechanism 44. An operation panel 46 on which the STOP switch 13, the REW switch 14, the PLAY(R) switch 15, the REC switch 16, the PLAY(F) switch 17, the FF switch 18 and the PAUSE switch 19 are arranged extends toward the front from the main chassis 45 at the lower end thereof.

A head chassis 47 is supported at approximately the center of the main chassis 45 to be reciprocally movable in the directions indicated by arrows A and B in FIG. 2. The recording/playback head 25 is mounted on the head chassis 47 through a head rotating mechanism 48a of said track switching mechanism 48. The head chassis 47 is slid in the directions indicated by arrows A and B in FIG. 2 by means of the head moving mechanism (not shown in FIG. 2), so that the recording/playback head 25 comes in contact with or is separated from a tape (not shown).

Tape guide portions 49a and 50a of tape guides 49 and 50, capstans 51 and 52, and pinch rollers 53 and 54 are respectively disposed at two sides of the recording/playback head 25. The pinch rollers 53 and 54 selectively come in contact with the capstans 51 and 52 by means of a pinch roller drive mechanism (to be described later) in accordance with the forward or reverse direction of tape travel at normal speed. The tape guide portions 49a and 50a are supported to be movable in the directions indicated by arrows A and B. When the tape guide portions 49a and 50a are moved in the direction indicated by arrow A, they come in contact with the tape to guide it. However, when the tape guide portions 49a and 50a are moved in the direction indicated by arrow B, they are separated from the tape and do not guide it. The tape guide portions 49a and 50a are selectively moved in the directions indicated by arrows A and B by means of a tape guide drive mechanism (to be described later) in accordance with the forward or reverse direction of the tape travel at normal speed.

A left reel table 55 and a right reel table 56 extend at approximately the center of the main chassis 45 so as to interpose the head chassis 47 therebetween. The right and left reel tables 56 and 55 are connected to a tape terminal end detecting mechanism (not shown). At the upper portion of the main chassis 45 in FIG. 2 are disposed a tape counter 57 connected to the right reel table 56, a motor 58 as a power source of the drive systems, and control levers 59 and 60 of the automatic reverse cycle limiting mechanism and the manual reverse mechanism.

Figure 3:
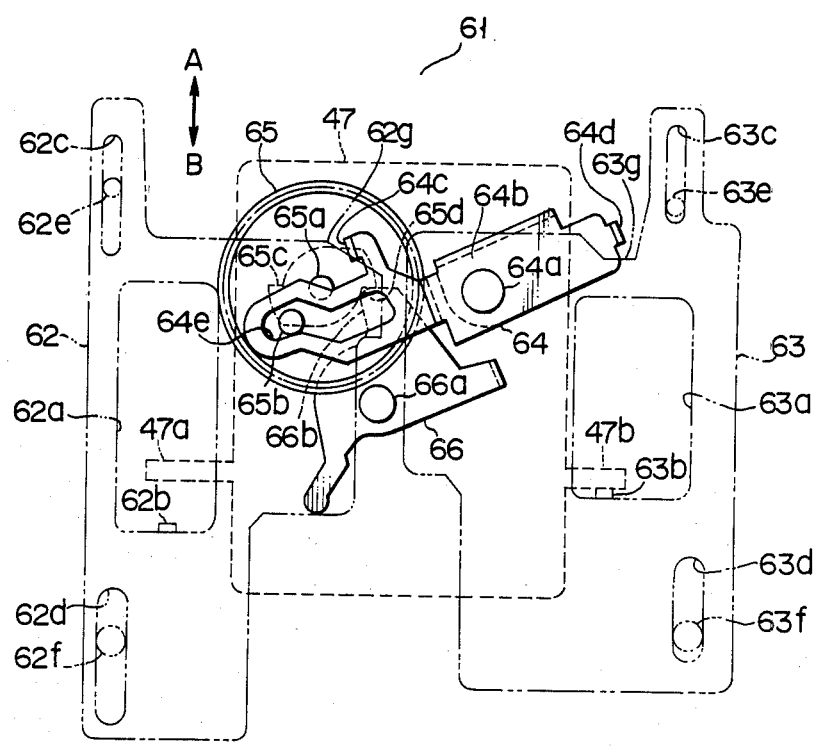
FIGS. 3 to 5 are views of a forward/reverse switching mechanism of the tape recorder mechanism in FIG. 2 in order to explain the mode of operation thereof.

FIG. 3 shows the forward/reverse switching mechanism 61 of the tape recorder mechanism 44 shown in FIG. 2. The head chassis 47 is indicated by the dotted line in FIG. 3 and is illustrated in a simple manner for descriptive convenience. A pair of projections 47a and 47b are formed at predetermined positions of the two sides of the head chassis 47. The projections 47a and 47b of the head chassis 47 engage with engaging portions 62b and 63b formed at the lower portions of through holes 62a and 63b. The through holes 62a and 63b are respectively formed at approximately the centers of left and right playback sliders 62 and 63 indicated by the alternate long and two dashed lines. A pair of elongated holes 62c and 62d are formed in the left playback slider 62, and a pair of elongated holes 63c and 63d are formed in the right playback slider 63. Guide pins 62e and 62f which are formed on the main chassis 45 are fitted in the elongated holes 62c and 62d, and guide pines 63e and 63f which are also formed on the main chassis 45 are fitted in the elongated holes 63c and 63d. Thus, the right and left sliders 63 and 62 are reciprocally movable in the directions indicated by arrows A and B (FIG. 3) in the same manner as the head chassis 47.

The right and left playback sliders 63 and 62 are respectively urged by springs (not shown) in the direction indicated by arrow A in FIG. 3. The head chassis 47 is urged by a spring (not shown) in the direction indicated by arrow B in FIG. 3. The spring which urges the head chassis 47 has an urging force greater than that of the springs which urge the right and left playback sliders 63 and 62 in the direction indicated by arrow A. In the STOP mode, since the head chassis 47 is moved in the direction indicated by arrow B, the left and right playback slider 62 and 63 are moved in the direction indicated by arrow B in FIG. 3 since the engaging portions 62b and 63b are respectively urged by the projections 47a and 47b of the head chassis 47. When the operator presses or touches one of the PLAY(R) and PLAY(F) switches 15 and 17 or both, the LSI 11 produces a signal to dive a head moving mechanism to be described later. As a result, the head chassis 47 is moved against the urging force of the spring in the direction indicated by arrow A in FIG. 3. The left and right playback slider 62 and 63 control idlers (not shown) and gears (not shown) when transmit rotation of the motor 58 to the left and right reel tables 55 and 56. In particular, when the left playback slider 62 is slid in the direction indicated by arrow A in FIG. 3, the left reel table 55 is driven to take up the tape. Thus, the tape is played in the reverse direction. When the right playback slider 63 is slid in the direction indicated by arrow A in FIG. 3, the right reel table 56 is driven to take up the tape. Thus, the tape is played in the forward direction. The forward or reverse travel of the tape is determined by movement of the right playback slider 63 or the left playback slider 62 in the direction indicated by arrow A in FIG. 3.

A tapered engaging portion 62g is formed at the upper right portion of the left playback slider 62 in FIG. 3. A concave-shaped notched engaging portion 63g is formed substantially at the upper central portion of the right playback slider 63 in FIG. 3. A reverse drive lever 64 is disposed on the lower surfaces of the left and right playback slider 62 and 63 and is supported to be rotatable about a shaft 64a extending on the main chassis 45. A bent engaging portion 64c which engages with the engaging portion 62g of the left playback slider 62 is formed at the left portion of a base body 64b of the reverse drive lever 64 in FIG. 3. A bent engaging portion 64d which engages with the engaging portion 63g of the right playback slider 63 is formed at the right portion of the base body 64b of the reverse drive lever 64 in FIG. 3. Further, an elongated hole 64e of a substantially crank shape is formed at the left portion of the base body 64b of the reverse drive lever 64 in FIG. 3.

A projection 65b extending from one side surface of a gear 65 is fitted in the elongate hole 64e of the reverse drive lever 64. The gear 65 is supported to be rotatable about a shaft 65a which extends on the main chassis 45. When the gear 65 is rotated, the reverse drive lever 64 swings about the shaft 64a. A pair of engaging portions 65c and 65d, which engage with a locking lever 66 (to be described later) upon rotation of the gear 65 in the clockwise direction in FIG. 3, are formed on the side surface opposite the side surface of the gear 65 on which the projection 65b is formed. The engaging portions 65c and 65d oppose each other with the shaft 65a interposed therebetween. The locking lever 66 is supported to be pivotal about a shaft 66a extending on the main chassis 45. An engaging portion 66b which is selectively engageable and disengageable from the engaging portions 65c and 65d of the gear 65 is formed in the locking lever 66. The locking lever 66 is constantly urged counterclockwise (FIG. 3), that is, in the direction where the engaging portion 66b engages with the engaging portions 65c and 65d of the gear 65. The locking lever 66 is pivoted clockwise in FIG. 3 against the urging force of the spring when the terminal end of the tape is detected in the automatic reverse mode or when the control lever 60 (FIG. 2) of the manual reverse mechanism is pivoted. Thus, the engaging portion 66b of the locking lever 66 disengages from the engaging portions 65c and 65d of the gear 65.

The gear 65 constantly meshes with a first gear (not shown). The gear ratio of the first gear to the gear 65 is 1 to 2. When the first gear revolves once, the gear 65 revolves half of one revolution. A notched portion is formed at a predetermined position of the first gear. The notched portion opposes a second gear which is driven by the motor 58 in one direction independent of the tape travel. When the second gear meshes with the first gear, the second gear causes the first gear to rotate the gear 65 clockwise in FIG. 3.

In the arrangement described above, assume that the operator presses or touches both the PLAY(R) and PLAY(F) switches 15 and 17. The head chassis moving mechanism is driven to slide the head chassis 47 in the direction indicated by arrow A. The engaging portions 62b and 63b of the left and right playback sliders 62 and 63 are respectively detached from the projections 47a and 47b of the head chassis 47. Thus, the head chassis 47 is slid in the direction indicated by arrow A in FIG. 3 by the urging force of the spring. If the engaging portion 66b of the locking lever 66 engages with the engaging portion 65d of the gear 65, the reverse drive lever 64 is regulated to the position shown in FIG. 3 by the projection 65b. Therefore, the right playback slider 63 is sufficiently moved in the direction indicated by arrow A, while the left playback slider 62 is not sufficiently moved in the direction indicated by arrow A since its engaging portion 62g abuts against the bent engaging portion 64c of the reverse drive lever 64. Idlers or the like which are controlled by the right playback slider 63 are then moved to predetermined positions where the right reel table 56 is rotated. Thus, forward playback is performed. The recording/playback head 25 (FIG. 2) of the head chassis 47 is in contact with the tape. In this case, since the reverse drive lever 64 limits rotation of the left playback slider 62 which is urged in the direction indicated by arrow A, the reverse drive lever 64 is pivoted clockwise in FIG. 3. The gear 65 which has the projection 65b fitted in the elongated hole 64e of the reverse drive lever 64 is also pivoted clockwise in FIG. 3. However, since the engaging portion 65d of the reverse drive lever 64 engages with the engaging portion 66b of the locking lever 66, the gear 65 does not rotate and the reverse drive lever 64 is kept in the position shown in FIG. 3.

Figure 4:
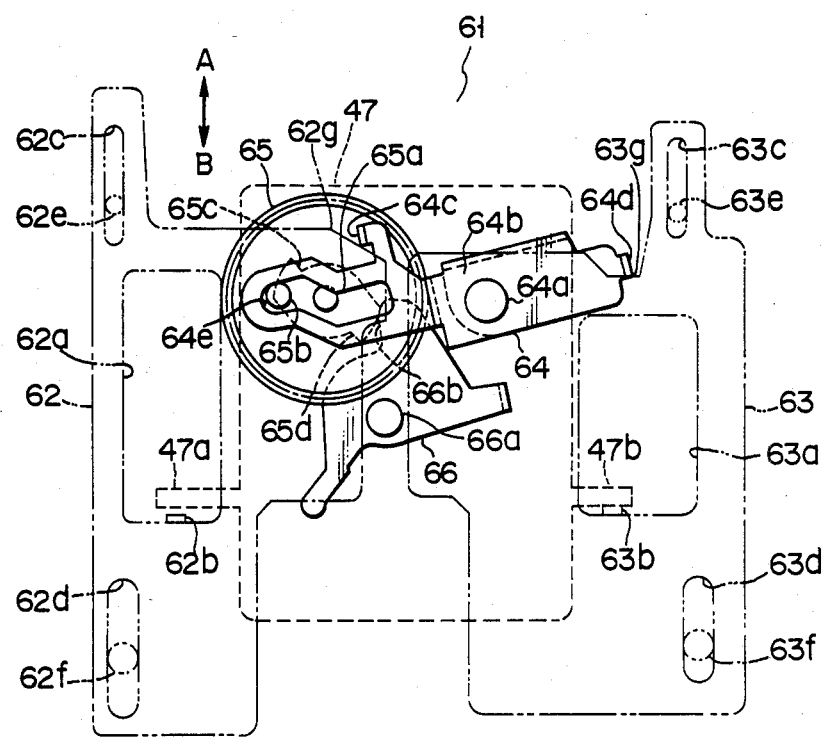

In the forward playback mode described above, assume that the tape reaches its end. The locking lever 66 is pivoted clockwise in FIG. 4 by means of the tape terminal end detecting mechanism. The engaging portion 66b of the locking lever 66 is disengaged from the engaging portion 65d of the gear 65. As described above, since the urging force is applied to the gear 65 in the clockwise direction in FIG. 3, the gear 65 is rotated slightly clockwise in FIG. 4. The first gear meshed with the gear 65 is slightly rotated counterclockwise. The first gear then meshes with the second gear, so that the gear 65 is rotated by the second gear in the clockwise direction in FIG. 4.

Figure 5:
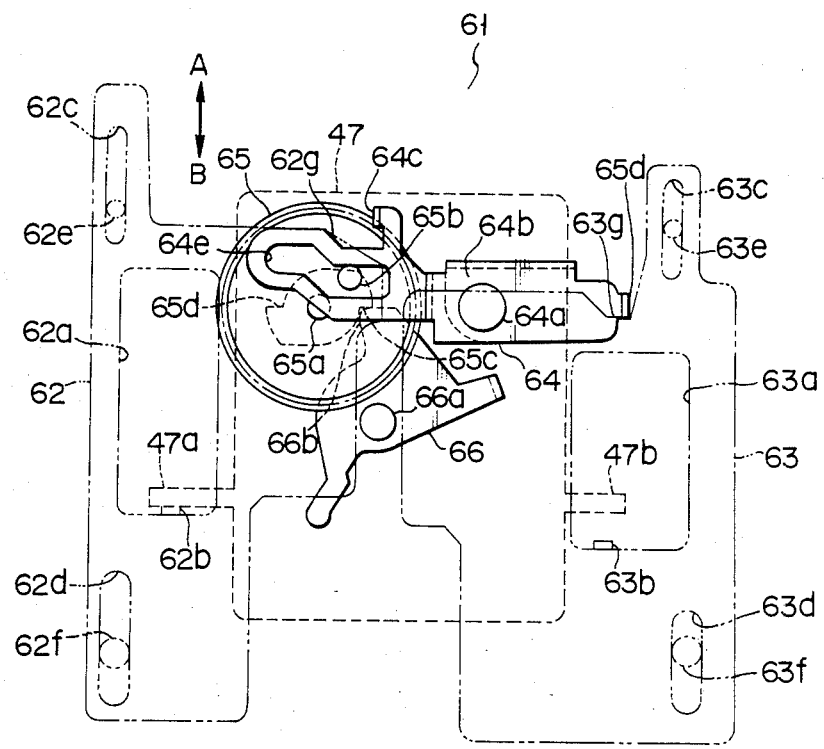

When the first gear revolves once and the notched portion thereof opposes the second gear again, the gear 65 is rotated half of one revolution, as shown in FIG. 5, so that the engaging portion 65c thereof is stopped by the engaging portion 66b of the locking lever 66. Upon movement of the projection 65b of the gear 65, the reverse drive lever 64 is pivoted clockwise in FIG. 5. The bent engaging portion 64d of the reverse drive lever 64 abuts against the engaging portion 63g of the right playback slider 63. The right playback slider 63 is withdrawn in the direction indicated by arrow B in FIG. 5. Meanwhile, the left playback slider 62 is sufficiently moved in the direction indicated by arrow A since the engaging portion 62g of the left playback slider 62 is disengaged from the bent engaging portion 64c of the reverse drive lever 64. The idlers or the like which are controlled by the left playback slider 62 are moved to a predetermined position where the left reel table 55 is rotated. Therefore, reverse playback is performed. The recording/playbck head 25 mounted on the head chassis 47 is brought into contact with the tape.

The head chassis 47 is moved in the direction indicated by arrow B by means of the head moving mechanism when forward playback is switched to reverse playback and vice versa. The head chassis 47 is then moved in the same direction as the left playback slider 62 or the right playback slider 63, that is, in the direction indicated by arrow A.

In the state shown in FIG. 5, since the reverse drive lever 64 limits movement of the right playback slider 63 in the direction indicated by arrow A, the urging force is applied to the reverse drive lever 64 in the counterclockwise direction in FIG. 5. The gear 65 is then urged clockwise in FIG. 5. However, since the engaging portion 65c of the gear 65 engages with the engaging portion 66b of the locking lever 66, the gear 65 does not rotate and the reverse drive lever 64 is kept in the position shown in FIG. 5.

In the reverse playback mode described above, when the tape reaches its end, the locking lever 66 is pivoted clockwise in FIG. 5 by means of the tape terminal end detecting mechanism. Substantially in the same manner as described above, the gear 65 is rotated half of one revolution in the clockwise direction in FIG. 5. Thus, forward playback as shown in FIG. 3 is restarted. It may be apparent that the forward/reverse switching mechanism 61 is operated not only when the tape reaches its terminal end but also when the control lever 60 of the manual reverse mechanism is pivoted. The tape can be driven in the forward or reverse direction any time.

Figure 6:
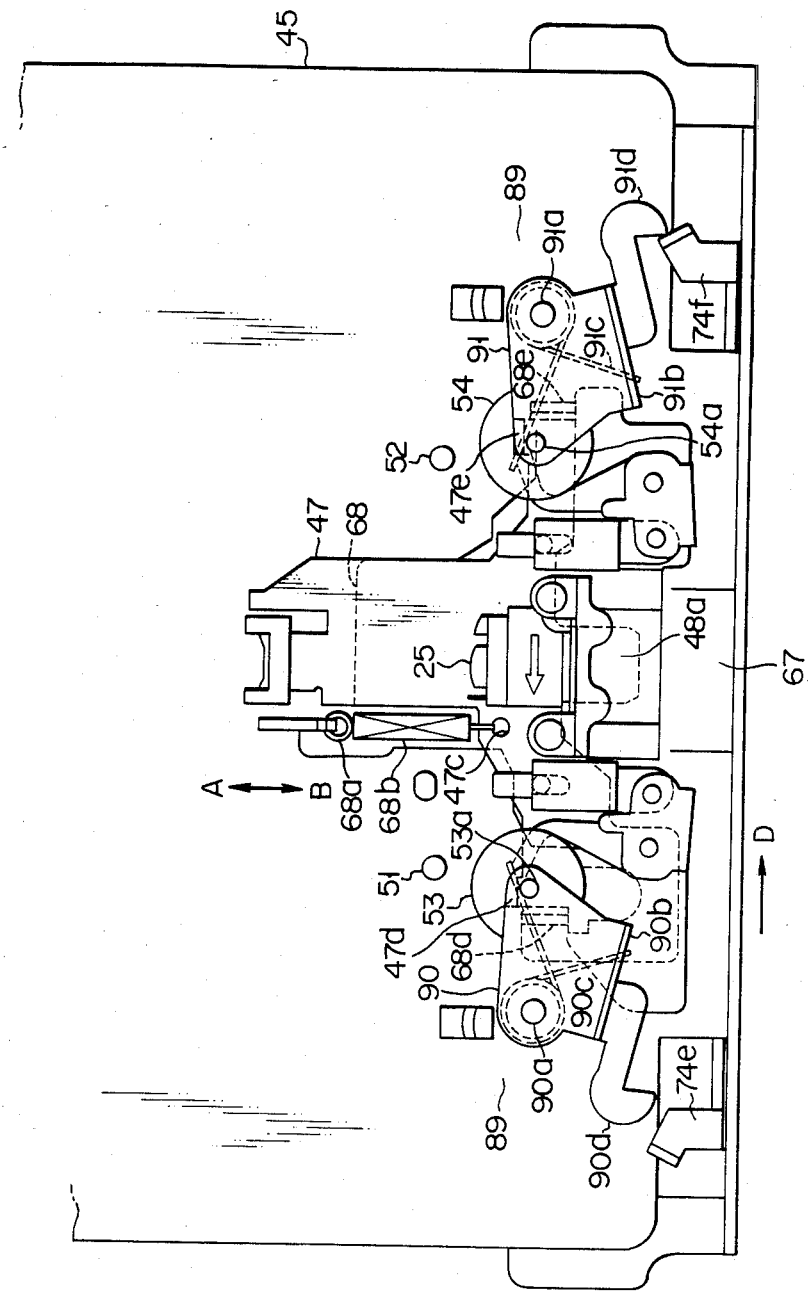
FIG. 6 is a view showing a head moving mechanism and a pinch roller drive mechanism of the tape recorder mechanism shown in FIG. 2.
Figure 7:
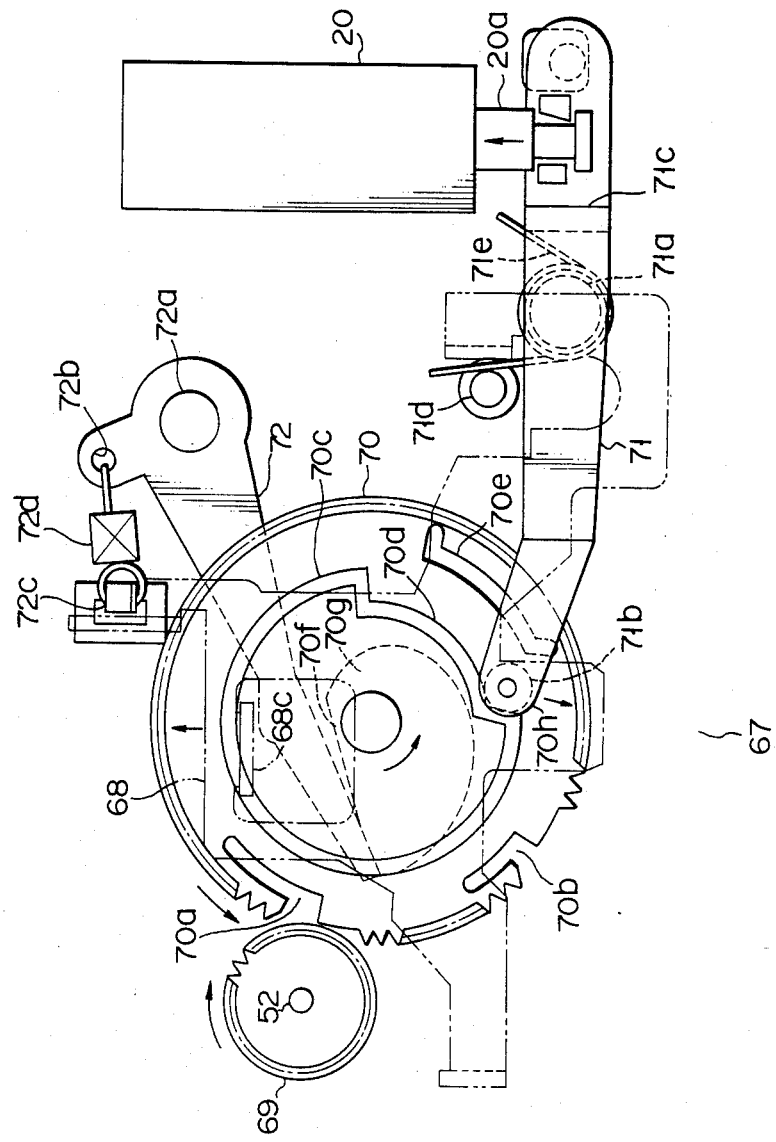
FIGS. 7 and 8 are detailed views showing the head moving mechanism in order to explain the mode of operation thereof.

The forward/reverse switching mechanism 61 has been described above. Now, a head moving mechanism 67 will be described with reference to FIG. 6. Referring to FIG. 6, a head slider 68 is interposed between the main chassis 45 and the head chassis 47. The head slider 68 is interlocked with the head chassis 47 by hooking a coil spring 68b between a bent engaging portion 68a formed on one side of the head slider 68 and a through hole 47c formed in the end portion of the head chassis 47. The head moving mechanism 67 causes the head slider 68 to move in the direction indicated by arrow A in FIG. 6. Therefore, the head chassis 47 is slid in the same direction as the head slider 68 through the spring 68b. As shown in FIG. 7, the capstan 52 disposed at a predetermined position of the main chassis 45 is rotatably supported. A flywheel (not shown) and a small-diameter gear 69 are coaxial with the capstan 52. The flywheel transmits the rotational force of the motor 58 via a belt (not shown) and is driven at normal speed. A large-diameter gear 70 which can be meshed with the gear 69 is rotatably supported on the main chassis 45. Two notched portions 70a and 70b which can be meshed with the gear 69 are formed in the gear 70 at positions at an angular interval of 90° with respect to the rotating center thereof.

A substantially ring-shaped guide wall 70c is formed on one surface of the gear 70, which does not oppose the main chassis 45. Most of the guide wall 70c is concentrical with the gear 70, and a recess 70d which has a smaller radius than that of most of the guide wall 70c is formed at an angular interval of 90° with respect to the rotating center of the gear 70. An arcuated control wall 70e which has a large diameter is disposed to oppose the recess 70d of the gear 70.

One end of a locking member 71 is located at one side of the gear 70. The locking member 71 is supported at substantially the center thereof to be rotatable about a shaft 71a. A roller 71b is supported at one end of the locking member 61 to engage with the guide wall 70c of the gear 70. A drive portion 20a of the solenoid plunger 20 is coupled to the other end of the locking member 71. The locking member 71 is urged clockwise in FIG. 7, that is, in the direction where the roller 71b is urged against the outer surface of the guide wall 70c of the gear 70 by means of a torsion spring 71e wound around the shaft 71a. One end of the torsion spring 71e is stopped between the shaft 71a and a step portion 71c, and the other end of the torsion spring 71e is stopped by a pin 71d extending from the main chassis 45.

A cam portion 70g which has an arcuated portion and a flat portion 70f is formed on the side of the gear 70 which opposes the main chassis 45. An engaging portion 68c which is formed by bending part of the head slider 68 is disposed in the upper portion of the cam portion 70g in FIG. 7 to oppose the cam portion 70g indicated by the alternate long and two dashed lines. One end of a drive lever 72 is interposed between the cam portion 70g of the gear 70 and the engaging portion 68c of the head slider 68. The other end of the drive lever 72 is supported to be rotatable about a shaft 72a extending on the main chassis 45. The drive lever 72 is urged counterclockwise in FIG. 7 by a coil spring 72d hooked between a through hole 72b formed at the other end portion of the drive lever 72 and an engaging portion 72c extending from the main chassis 45.

One end of the drive lever 72 urges one end of the flat portion 70f of the gear 70, so that the gear 70 tends to rotate counterclockwise in FIG. 7. However, rotation of the gear 70 is prevented since the step portion 70h of the gear 70 between the recess 70d and the guide wall 70c abuts against the roller 71b of the locking member 71. At this time, the notched portion 70a of the gear 70 opposes the gear 69. Even if the flywheel is rotated, the rotational force may not be transmitted to the gear 70.

In this condition, when the operator presses or touches one of the PLAY(R) and PLAY(F) switches 15 and 17, or both, the LSI 11 produces a signal to drive the solenoid plunger 20. A drive portion 20a of the solenoid plunger 20 is moved in the direction indicated by the arrow in FIG. 7. The locking member 71 is pivoted counterclockwise in FIG. 7 against the urging force of the torsion spring 71e. The roller 71b of the locking member 71 is smoothly detached from the step portion 70h of the gear 70. The gear 70 is pivoted counterclockwise in FIG. 7 by the urging force of the drive lever 72. The gear 70 is then meshed with the gear 69 which is driven at normal speed in the clockwise direction in FIG. 7. Thus, the gear 70 is pivoted counterclockwise in FIG. 7. One end of the drive lever 72 is pushed upward by the arcuated portion of the cam portion 70g, so that the the drive lever 72 is pivoted clockwise in FIG. 7 against the urging force of the spring 72d. One end of the drive lever 72 abuts against the engaging portion 68c of the head slider 68, and the head slider 68 is moved upward in FIG. 7. As described above, the head chassis 47 interlocked with the head slider 68 is slid upward in FIG. 6. As a result, the recording/playback head 25 is brought into contact with the tape.

Figure 8:
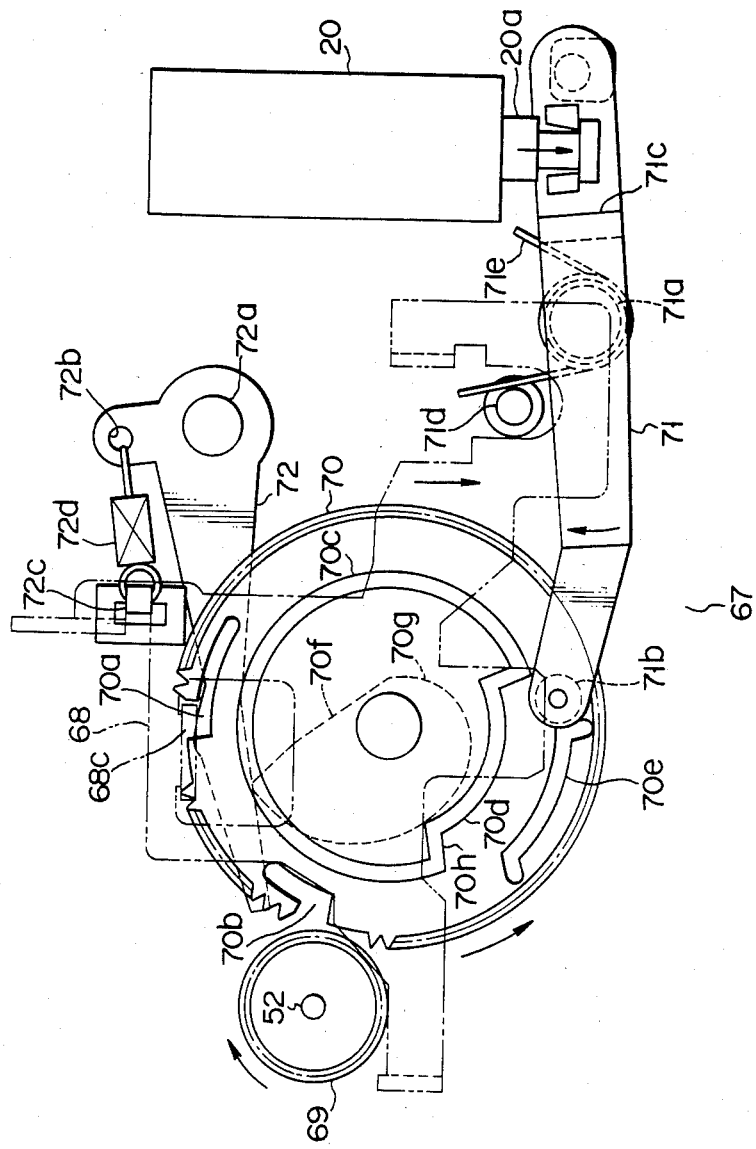

Since the solenoid plunger 20 is driven when the tape is driven at normal speed, the gear 70 is rotated by three-fourths of one revolution in the counterclockwise direction from the position indicated in FIG. 7, and the notched portion 70b of the gear 70 opposes the gear 69 as shown in FIG. 8. The roller 71b of the locking member 71 abuts against one end of the control wall 70e of the gear 70, so that rotation of the gear 70 is interrupted. At this time, one end of the drive lever 72 is kept in an uppermost position and abuts against the boundary of the arcuated and flat portions of the cam portion 70g. The gear 70 tends to be rotated in a counterclockwise direction in FIG. 8 by the urging force of the spring 72d. However, since the roller 71b of the locking member 71 abuts against one end portion of the control wall 70e of the gear 70, rotation of the gear 70 is interrupted. In this condition, the tape is driven at normal speed. Further, in the condition where the tape is driven at normal speed, as shown in FIG. 8, assume that the operator presses or touches the STOP switch 13. The LSI 11 produces a signal to deenergize the solenoid plunger 20. The locking member 71 is urged by the urging force of the torsion spring 71e in the clockwise direction in FIG. 8. The roller 71b is rotated and is smoothly separated from one end of the control wall 70e of the gear 70 and is urged into the recess 70d. Since the urging force is applied to the gear 70 (which is maintained in the condition shown in FIG. 8) through the drive lever 72, the gear 70 is rotated counterclockwise in FIG. 70 and is meshed again with the gear 69. The gear 70 is further rotated counterclockwise in FIG. 9, and the roller 71b of the locking member 71 is stopped again by the step portion 70h of the gear 70, as shown in FIG. 7, so that rotation of the gear 70 is stopped.

At this time, since the drive lever 72 is pivoted counterclockwise in FIG. 7 by the urging force of the spring 72d, the head slider 68 and the head chassis 47 are restored to the original positions, and the operation is stopped. The LSI causes the tape terminal end detecting mechanism to produce a detection signal so as to deenergize the solenoid plunger 20. Thus, the stop mode is set. In the condition where the tape is driven at normal speed as shown in FIG. 8, the teeth formed of the gear 70 between the notched portions 70b and 70a are meshed with the gear 69, and the urging force applied to the gear 70 in the counterclockwise direction in FIG. 8 by the drive lever 72 is limited by the inertia of the flywheel. The step portion 70h does not bump against the roller 71b.

When the operator presses or touches the REC switch 16 and one of the PLAY(R) and PLAY(F) switches 15 and 17, the head moving mechanism 67 is stabilized in the position indicated in FIG. 8 and the circuit shown in FIG. 1 is set in the recording mode.

In the automatic reverse mode when the operator presses or touches the PLAY(R) and PLAY(F) switches 15 and 17, the LSI 11 causes the solenoid plunger 20 to turn on in the condition shown in FIG. 7. Forward or reverse playback is then performed, as shown in FIG. 8. When the LSI 11 detects that the detection signal is produced by the tape terminal end detecting mechanism, the LSI 11 temporarily deenergizes the solenoid plunger 20. The stop mode is thus set, as shown in FIG. 7. Thereafter, the head chassis 47 is temporarily moved downward as in FIG. 6. The LSI 11 then automatically produces the signal to power the solenoid plunger 20 again. The condition shown in FIG. 8 is then restored, so that the head chassis 47 is moved upward in FIG. 8. As described with reference to FIGS. 3 to 5, forward driving is switched to reverse driving, or vice versa. At this time, the LSI 11 temporarily deenergizes the solenoid plunger 20. Thereafter, the solenoid plunger 20 is powered again.

In the reciprocal recording mode wherein the operator presses or touches the REC switch 15 and the PLAY(F) and PLAY(F) switches 15 and 17, the circuit shown in FIG. 1 is set to the recording mode. Other mechanical operation is the same as reciprocal playback described above.

Figure 9:
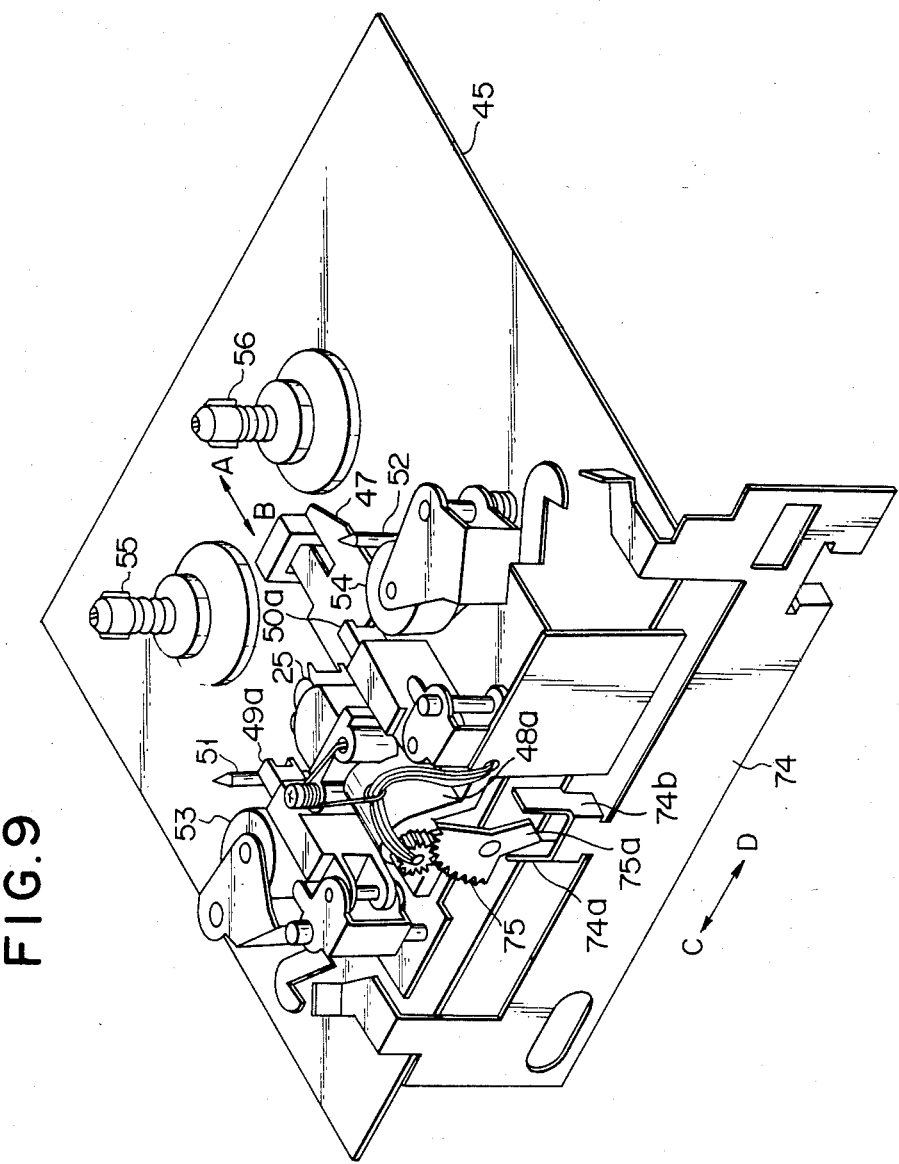
FIG. 9 is a schematic perspective view showing a head rotating mechanism of the tape recorder mechanism shown in FIG. 2.

Said head rotating mechanism 48a will be described in detail with reference to FIG. 9. The recording/playback head 25 is mounted on the head chassis 47 through the head rotating mechanism 48a. A drive slider 74 which is free to slide in the directions indicated by arrows C and D in FIG. 9 is supported at the front end portion of the main chassis 45. A pair of clamping portions 74a and 74b extend at approximately the center of the drive slider 74. A drive portion 75a (to be described in detail later) of a sector-shaped gear 75 which is disposed in the head rotating mechanism 48a is disposed between the clamping portions 74a and 74b of the drive slider 74.

Figure 10:
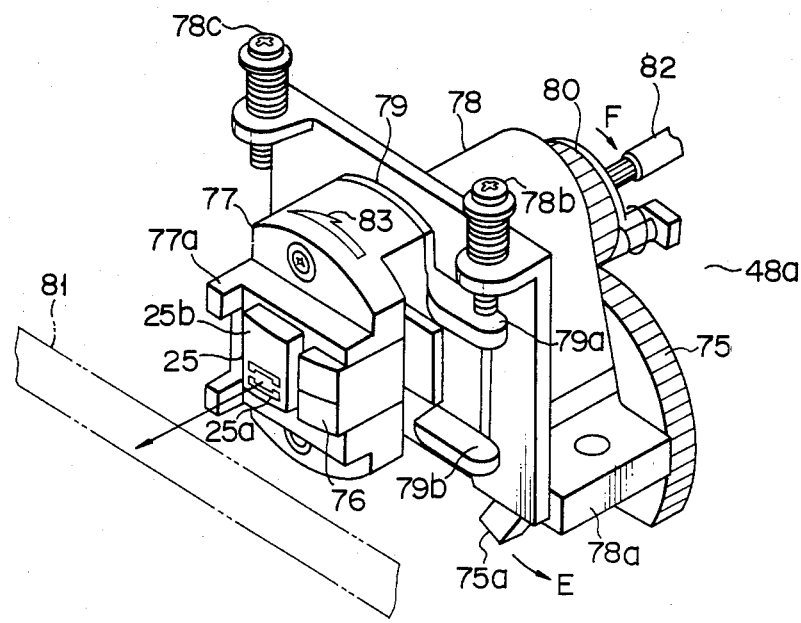
FIGS. 10 and 11 are detailed perspective views showing the head rotating mechanism in order to explain the mode of operation thereof.

FIG. 10 shows the outer appearance of the head rotating mechanism 48a. The recording/playback head 25 is especially used for a microcassette tape recorder. A head assembly 25 is disposed near one side of a tape contact surface 25b. The recording/playback head 25 is parallel to an erase head 76 for the microcassette tape recorder and is fitted in a substantially cylindrical head support 77.

A head mount assembly 78 integrally supports a head base plate 79 and a gear 80. A substantially sector-shaped gear 75 which meshes with the gear 80 is supported by the head mount assembly 78 to be rotatable at the proximal portion of the sector-shaped gear 75. The head support 77 is mounted on the head base plate 79.

A mounted portion 78a of the head mount assembly 78 contacts the head chassis 47 and is fixed by screws (not shown). The tape contact surface 25b faces upward in FIG. 3 in the condition where the head mount assembly 78 is mounted on the head chassis 47. A driven portion 75a extends from the proximal portion of the sector-shaped gear 75. The driven portion 75a is interposed between the clamped portions 74a and 74b of the drive slider 74 in the condition where the head mount assembly 78 is mounted on the head chassis 47. Even if the head chassis 47 is moved in the directions indicated by arrows A and B in FIG. 9, the driven portion 75a may not escape from the space between the clamping portions 74a 74b. As described above, for switching forward driving to reverse driving or vice versa, the drive slider 74 is moved in the directions indicated by arrows C and D in FIG. 9, and the sector-shaped gear 75 is pivoted about its proximal portion.

Figure 11:
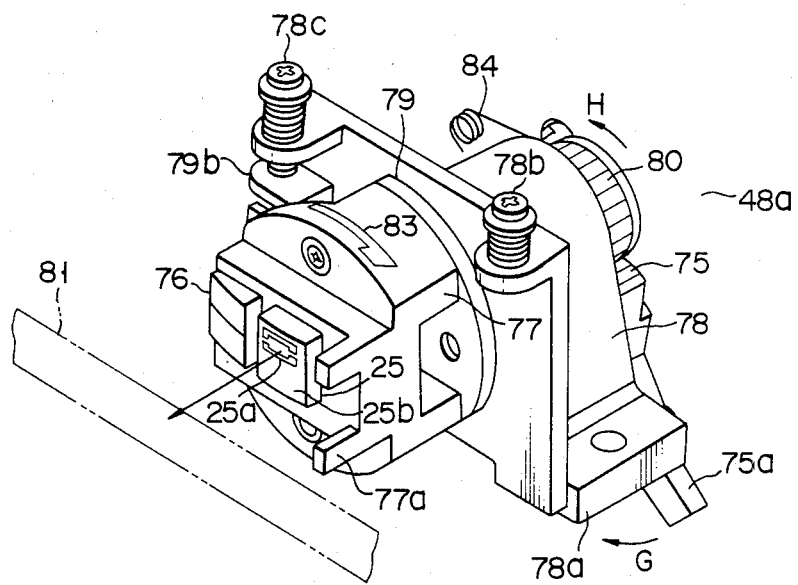

If the sector-shaped gear 75 is pivoted in the direction indicated by arrow E in FIG. 10, the gear 80 which is meshed with the sector-shaped gear 75 is pivoted in the direction indicated by arrow F. The head base plate 79 and the head support 77 are also rotated in the direction indicated by arrow F. The recording/playback head 25 and the erase head 76 are rotated through 180° as shown in FIG. 11. Although the head assembly 25 opposes the lower track of a tape 81 indicated by the alternate long and two dashed lines in FIG. 10, the head asesmbly 25a opposes the upper track of the tape 81 after its rotation through 180° as shown in FIG. 11. Thus, the track change (head movement) can be performed when the forward driving mode is switched to the reverse driving mode or vice versa. When the sector-shaped gear 75 is rotated in the direction indicated by arrow G in FIG. 11, the gear 80, the head base plate 79 and the head support 77 are rotated in the direction indicated by arrow H in FIG. 11. Thus, the recording/playback head 25 and the erase head 76 return to their original positions.

The recording/playback head 25 and the erase head 76 contact the tape 81 via head insertion holes which are formed in the cassette half of the compact tape cassette.

A pair of engaging portions 79a and 79b extend at part of the head base plate 79. A pair of screws 78b and 78c are screwed in one side of the head mount assembly 78. The head base plate 79 is rotated until the engaging portions 79a and 79b respectively abut against the screws 78b and 78c, as shown in FIG. 11. The azimuths of the recording/playback head 25 and the erase head 76 can be adjusted by changing the screwing depths of the screws 78b and 78c. The recording/playback head 25 and the erase head 76 are connected to the recording/playback circuits through lead wires extending through the rotating center of the gear 80 after extending through the head support 77, the head base plate 79 and the head mount assembly 78.

Arrows 83 are marked on one side of the head support 77 to indicate the directions of the tape travel, as shown in FIGS. 10 and 11.

A tape guide portion 77a which supports two edges of the tape 81 is formed at one side portion of the head support 77. A torsion spring 84 shown in FIG. 11 provide bistable function to stabilize the head support 77 in two positions shown in FIGS. 10 and 11.

Figure 12:
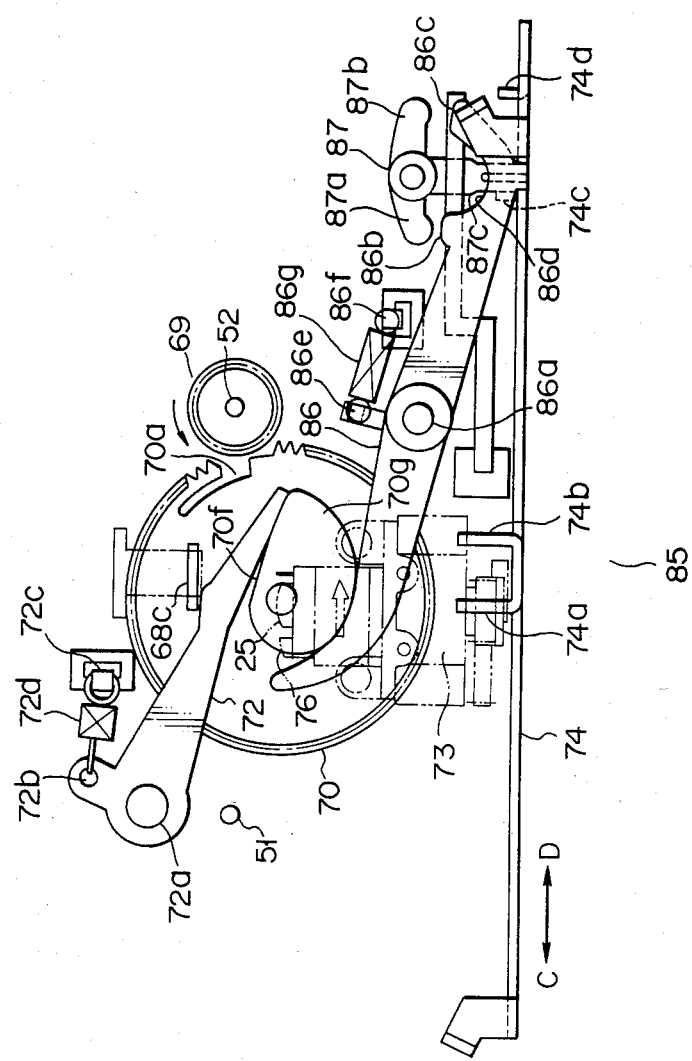
FIGS. 12 to 15 are views showing a drive mechanism for driving the head moving mechanism, the head rotating mechanism, and the pinch roller drive mechanism in order to explain the mode of operation of the drive mechanism.

A drive mechanism 85 for sliding the drive slider 74 in the directions indicated by arrows C and D in FIG. 9 to pivot the sector-shaped gear 75 of the head rotating mechanism 48a in FIG. 12 will be described. FIG. 12 shows the condition wherein the gear 70 is viewed from the direction opposite to the direction shown in FIGS. 7 and 8. One end of a control lever 86 abuts against the arcuated portion of the cam portion 70g of the gear 70. The control lever 86 is supported at substantially the center thereof to be pivotal about a shaft 86a extending on the main chassis 45. A pair of projections 86b and 86c are formed upward in FIG. 12 at the other end portion of the control lever 86. The distance between the projection 86b and the shaft 86a is different from that between the projection 86c and the shaft 86a. A concave-shaped arcuated portion 86d is formed between the projections 86b and 86c. A bent engaging portion 86e is formed in the vicinity of the shaft 86a of the control lever 86. Since a coil spring 86g is hooked between the bent engaging portion 86e and an engaging portion 86f formed on the main chassis 45, the control lever 86 is urged clockwise in FIG. 12. One end of the control lever 86 is urged against the cam portion 70g of the gear 70.

A substantially cylindrical driving shaft 87 is disposed above the arcuated portion 86d of the control lever 86 in FIG. 12 and is perpendicular to the control lever 86. A pair of projections 87a and 87b which respectively oppose the projections 86b and 86c of the control lever 86 are disposed at the side portion of the driving shaft 87 to oppose each other. A drive portion 87c extends downward in FIG. 12 from the side portion of the driving shaft 87. The distal end of the drive portion 87c is disposed between a pair of projections 74c and 74d which are formed at one end of the drive slider 74.

Figure 13:
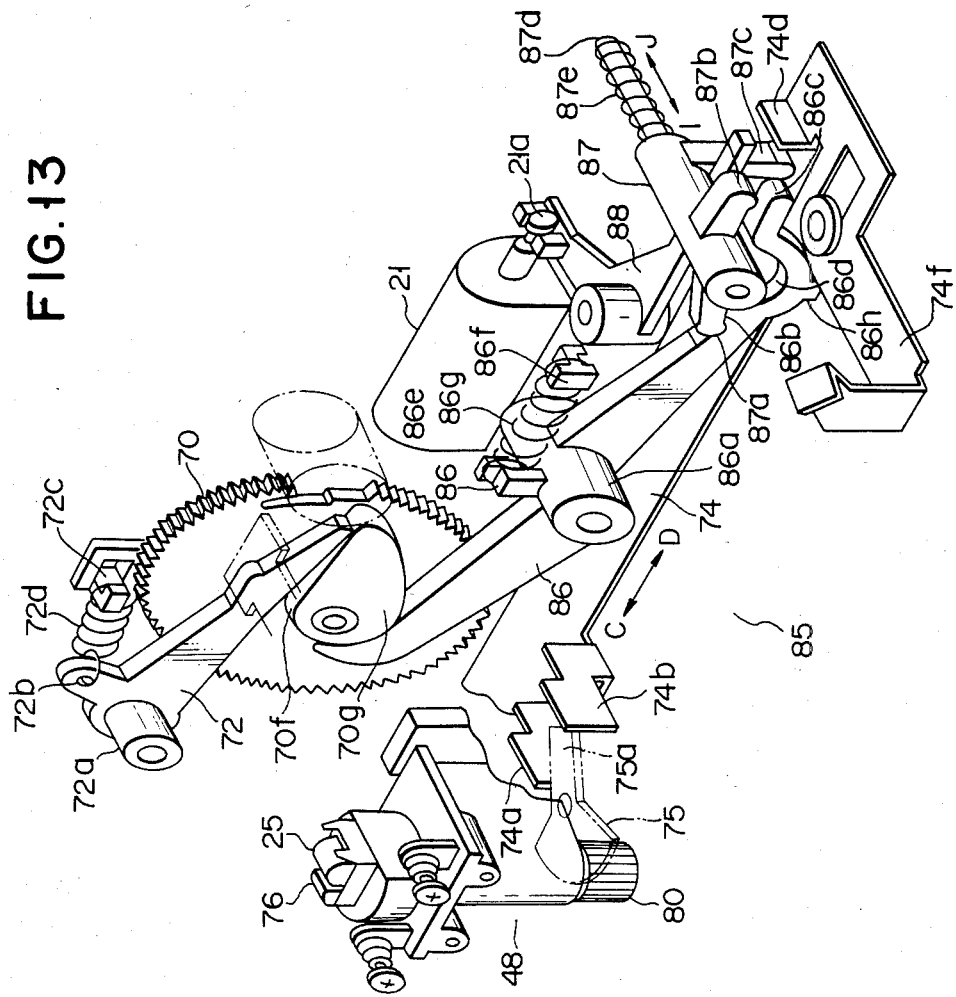

The projections 87a and 87b of the driving shaft 87 are formed in different positions along the longitudinal direction of the driving shaft 87, as shown in FIG. 13. A shaft portion 87d which has a smaller diameter than the driving shaft 87 and around which a spring 87e extends is supported to be slidable in the directions indicated by arrows I and J (FIG. 13), that is, in the longitudinal direction of the main chassis (not shown in FIG. 13) and to be pivotal about its axis. The driving shaft 87 is urged by the spring 87e in the direction indicated by arrow I. In this urging condition, the projection 87b opposes the projection 86c of the control lever 86.

One end of a substantially L-shaped switching lever 88 engages the drive portion 87c of the driving shaft 87. The switching lever 88 is supported at the bent portion thereof to be pivotal about the main chassis 45. The other end of the switching lever 88 is connected to a drive portion 21a of the solenoid plunger 21.

Figure 14:
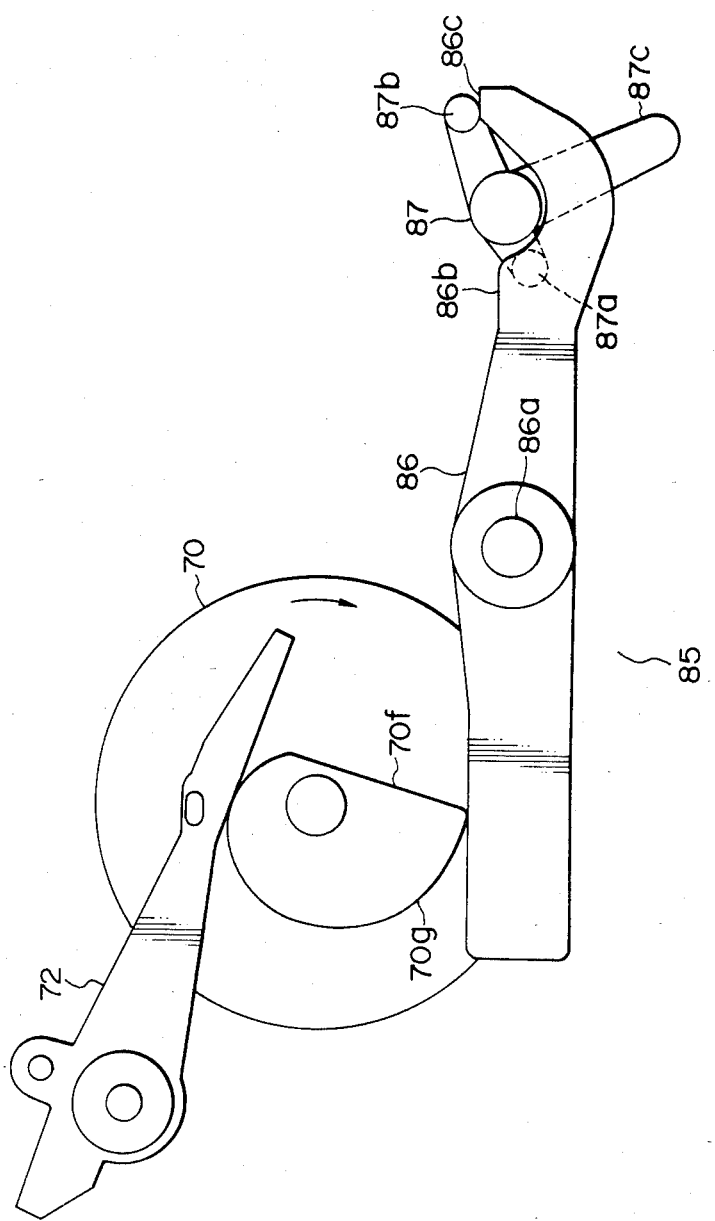

Assume that the operator presses or touches the PLAY(R) and PLAY(F) switches 15 and 17 to establish the automatic reverse mode. The gear 70 is rotated, and the head chassis 47 is slid upward in FIG. 6 by means of the cam portion 70g through the drive lever 72 and the head slider 68. The recording/playback head 25 is then brought into contact with the tape. At the same time, the control lever 86 is pivoted counterclockwise in FIG. 14 by means of the cam portion 70g of the gear 70 against the urging force of the spring 86g (FIG. 12). Since the projection 86c of the control lever 86 opposes the projection 87b of the driving shaft 87, the projection 86c urges the projection 87b, so that the driving shaft 87 is pivoted counterclockwise in FIG. 14. The drive portion 87c of the driving shaft 87 urges the projection 74d of the drive slider 74 shown in FIG. 12, so that the drive slider 74 is slid in the direction indicated by arrow D in FIG. 12. The sector-shaped gear 75 of the head rotating mechanism 48a which is disposed between the clamping portions 74a and 74b of the drive slider 74 is pivoted in the direction as shown in FIGS. 10 and 11. Thus, the recording/playback head 25 is rotated.

Assume that the tape is driven at normal speed in the forward direction. When the tap reaches its terminal end and when the detection signal is produced by the tape terminal end detecting mechanism, the LSI 11 produces the control signal to deenergize the solenoid plunger 20. Data of a predetermined duration for which the head chassis 47 is moved from the playback position, as shown in FIG. 7, to the stop position is preset in the LSI 11. When the predetermined duration has elapsed, the LSI 11 produces a signal to power the solenoid plungers 20 and 21. The drive portion 21a of the solenoid plunger 21 is moved, so that one end of the switching lever 88 is urged against the urging force of the spring 87e of the drive portion 87c of the driving shaft 87 in the direction indicated by arrow J in FIG. 13. The projection 87a of the driving shaft 87 opposes the projection 86b of the control lever 86 at this time.

Figure 15:
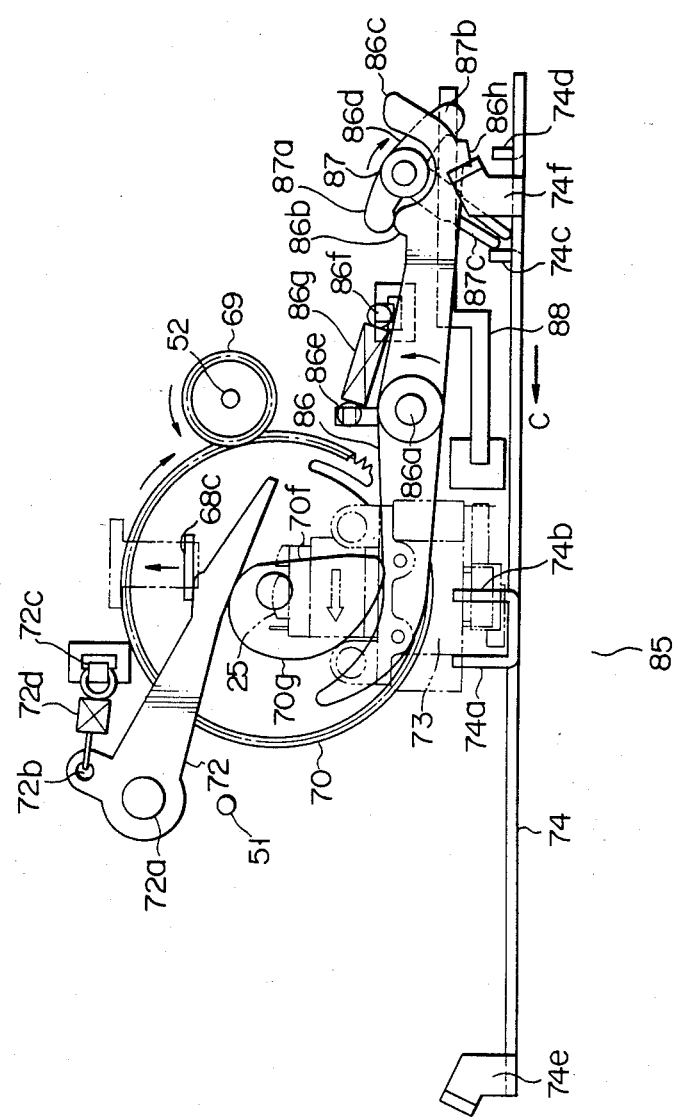

When the gear 70 is rotated, the drive lever 72 and the control lever 86 are respectively rotated counterclockwise in FIG. 15 by means of the cam portion 70g. The projection 86b of the control lever 86 urges the projection 87a of the driving shaft 87, so that the driving shaft 87 is pivoted clockwise in FIG. 15. The drive portion 87c of the driving shaft 87 urges the projection 74c of the drive slider 74, and the drive slider 74 is slid in the direction indicated by arrow C in FIG. 15. The sector-shaped gear 75 of the head rotating mechanism 48a is pivoted, and the recording/playback head 25 is rotated.

Before the tape reaches its end in the reverse playback mode, the LSI 11 stores data indicating that the previous mode is the reverse playback mode. When the tape terminal end detecting signal is produced, the solenoid plunger 20 is temporarily deenergized and then powered again in the same manner as described above. However, at this time, the solenoid 21 is not powered. When the control lever 86 is pivoted by the cam portion 70g, the projection 86c abuts against the projection 87b of the driving shaft 87. As described above, the drive slider 74 is slid in the direction indicated by arrow D in FIG. 13, and the recording/playback head 25 opposes a track for forward playback. In other words, when the tape terminal detecting signal is produced in the condition where the tape is driven at normal speed in the forward or reverse direction, the LSI 11 functions to supply power to or to deenergize the solenoid plunger 21.

When the gear 70 is rotated, the recording/playback head 25 is rotated and then the head chassis 47 is moved to a position where playback is performed. These operations are slightly delayed. When the gear 70 starts to be rotated, as is apparent from FIG. 15, the large-diameter portion of the cam portion 70g urges the control lever 86, while the small-diameter portion thereof urges the drive lever 72. The control lever 86 is first abruptly provided counterclockwise in FIG. 15, so that the recording/playback head 25 is quickly rotated. Thereafter, the gear 70 is further rotated to urge the large-diameter portion of the cam portion 70g so that the head chassis 47 is moved in the position where playback is performed. In this manner, after the recording/playback head 25 is rotated, the head chassis 47 is moved in the position described above. Reverse playback is switched to forward playback in the same manner as described above.

As shown in FIG. 13, a projection 86h is formed at the lower portion of the arcuated portion 86d of the control lever 86. When the notched portion 70a of the gear 70 opposes the gear 69 shown in FIG. 12, that is, when the tape recorder is set in the stop mode, the projection 86h engages with a control portion 74f of one of pinch lever control portions 74e and 74f (only the pinch lever control portion 74f is shown in FIG. 13) to be described later. Thus, the drive slider 74 may not be slid in the direction indicated by arrow C. This prevents damage to the head rotating mechanism 48a when the recording/playback head 25 is abruptly rotated due to vibration or dropping of the tape recorder. When the recording/playback head 25 in the automatic reverse mode is rotated, the control lever 86 is pivoted counterclockwise in FIG. 15, and the projection 86h of the control lever 86 is disengaged from the pinch lever control portion 74f of the drive slider 74, so that the drive slider 74 is free to slide.

A pinch roller drive mechanism 89 for selectively urging the pinch rollers 53 and 54 toward the capstans 51 and 52 will be described in detail with reference to FIG. 6. In FIG. 6, pinch levers 90 and 91 which rotatably support the pinch rollers 53 and 54, respectively, are disposed at the two sides of the head chassis 47 on the main chassis 45. The other end portions of pinch levers 90 and 91 are supported to be pivotal about shafts 90a and 91a, respectively, disposed on the main chassis 45. The pinch levers 90 and 91 are urged upward to make the pinch rollers 53 and 54 tightly contact the capstans 51 and 52 by means of torsion springs 90c and 91c. One end of each of the torsion springs 90c and 91c is stopped by one end of each of the pinch levers 90 and 91. The other end of each of the torsion springs 90c and 91c is stopped by each of bent engaging portions 68d and 68e formed at the two ends of the head slider 68, and each spring is hooked at each of the shafts 90a and 91a. Bent portions 47d and 47e which respectively engage from the above (FIG. 6) with rotating shafts 53a and 54a of the pinch rollers 53 and 54 are formed at the two sides of the head chassis 47. Engaging portions 90d and 91d which can be respectively engaged with the pinch lever control portions 74e and 74f of the drive slider 74 are formed from the side portions 90b and 91b of the pinch levers 90 and 91.

A case will be described in which the tape terminal end detecting signal is supplied to the LSI 11 in the reverse playback mode. As described above, the head chassis 47 is temporarily moved backward in the condition where the recording/playback head 25 is kept in the reverse playback mode as shown in FIG. 6. Thus, a mode which is the same as the stop mode is set in this condition. The bent portions 47d and 47e of the head chassis 47 respectively urge the rotating shafts 53a and 54a of the pinch rollers 53 and 54 downward (FIG. 6). The pinch levers 90 and 91 are pivoted clockwise and counterclockwise, respectively, in FIG. 6 against of the urging force of the tension springs 90c and 91c.

Figure 16:
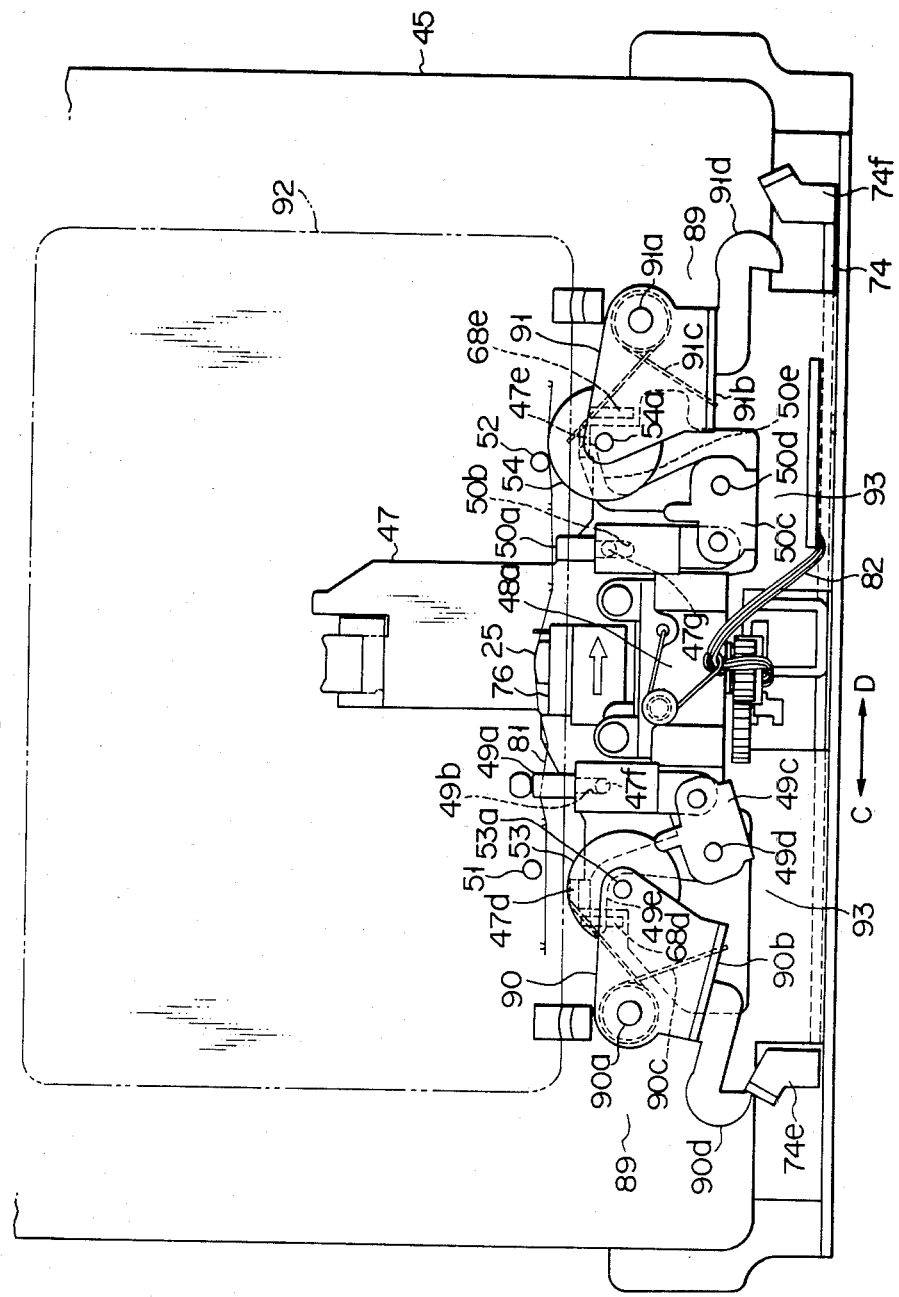
FIG. 16 is a detailed view showing the pinch roller drive mechanism and a tape guide drive mechanism.

In this condition, when the LSI 11 starts energizing the solenoid plunger 21 (FIG. 13), the drive slider 74 is slid in the direction indicated by arrow D in FIG. 6 and is moved to a position indicated in FIG. 16. The switching operation of the head rotating mechanism 48a is performed, and the recording/playback head 25 is set in the forward playback mode. Thereafter, the head slider 68 (not shown in FIG. 16) is moved upward in FIG. 16, and the head chassis 47 is interlockingly moved in the same direction as the head slider 68. Upon movement of the head slider 68, the pinch levers 90 and 91 are respectively pivoted counterclockwise and clockwise (FIG. 16) through the torsion springs 90c and 91c. As shown in FIG. 16, the engaging portion 90d of the pinch lever 90 abuts against the pinch lever control portion 74e of the drive slider 74, so that the pinch roller 53 is regulated to a position where the pinch roller 53 is not in contact with the capstan 51. Meanwhile, the engaging portion 91d of the pinch lever 90 does not abut against the pinch lever control portion 74f of the drive slider 74, so that the pinch roller 54 is in tight contact with the capstan 52 through the tape 81. When the head chassis 47 is sufficiently moved upward in FIG. 16, the recording/playback head 25 is inserted in a cassette half 92 indicated by the alternate long and two dashed lines in FIG. 16 and comes into contact with the tape 81. Thus, forward playback is performed.

Forward playback can be switched to reverse playback in the opposite manner, as described above. The engaging portion 91d of the pinch lever 91 abuts against the pinch lever control portion 74f of the drive slider 74, whereas the pinch roller 54 is not in tight contact with the capstan 52.

The tape guide drive mechanism 93 will be described with reference to FIG. 16. The tape guide portions 49a and 50a of the tape guides 49 and 50 are disposed at the two sides of the head rotating mechanism 48a of the head chassis 47. Grooves 49b and 50b are longitudinally formed in the tape guide portions 49a and 50a along the head chassis 47 to oppose the head chassis 47, as shown in FIG. 16. Pins 47f and 47g extending on the head chassis 47 can be respectively fitted in the grooves 49b and 50b. The lower end portion of the tape guide portion 49a is supported to be rotatable about one end of a guide lever 49c, and the lower end portion of the tape guide portion 50a is also supported to be rotatable about one end of a guide lever 50c, as shown in FIG. 16. The other end of each of the guide levers 49c and 50c is supported to be rotatable about a corresponding one of shafts 49d and 50d disposed on the head chassis 47. A substantially L-shaped arm 49e which engages with the rotating shaft 53a of the pinch roller 53 is formed at the other end of the guide lever 49c, and a substantially L-shaped arm 50e which engages with the rotating shaft 54a of the pinch roller 54 is formed at the other end of the guide lever 50c. The guide levers 49c and 50c are respectively pivotal counterclockwise and clockwise (FIG. 16) about the shafts 49d and 50d by the urging force of torsion springs (not shown) or the like until the distal ends of the arms 49e and 50e of the guide levers 49c and 50c respectively come into contact with the rotating shafts 53a and 54a of the pinch rollers 53 and 54.

As shown in FIG. 16, in the forward playback mode, the head chassis 47 is slid upward in FIG. 16 and at the same time the tape guide portions 49a and 50a are moved upward in FIG. 16. At this time, the pivotal movement of the pinch lever 90 is regulated in the position shown in FIG. 16, so that the guide lever 49c is pivoted and its arm 49e surrounds the rotating shaft 53a. As a result, the tape guide portion 49a is then pushed upward (FIG. 16) along the groove 49b thereof and comes into contact with the tape 81 to guide it. Meanwhile, since the pinch lever 50 is moved to bring the pinch roller 54 into tight contact with the capstan 52, the distal end of the arm 50e of the guide lever 50c is kept engaged with the rotating shaft 54a of the pinch roller 54. As a result, the tape guide portion 50a does not contact the tape 81.

In the reverse playback mode, the tape guide 50a is brought into contact with the tape 81, while the tape guide portion 49a is separated from the tape 81.

In summary, in the forward playback mode, the tape 81 travels to the right in FIG. 16. At this time, the tape guide portions 49a and 50a are respectively positioned in upstream and downstream sides of the tape 81 with respect to the recording/playback head 25. On the other hand, in the reverse playback mode, the tape 81 travels to the left in FIG. 16. At this time, the tape guide portions 49a and 50a are respectively positioned in the downstream and upstream sides of the tape 81 with respect to the recording/playback head 25.

In the tape recorder with the above arrangement, the driving shaft 87 is longitudinally slid in order to slide the drive slider 74 in the directions indicated by arrows C and D in FIG. 9. The drive slider 74 switches the head rotating mechanism 48a. The projections 87a and 87b extending from longitudinally shifted positions of the driving shaft 87 are selectively engaged with the projections 86b and 86c of the control lever 86. Therefore, the control lever 86, which is always urged in the same direction can move the drive slider 74 in the directions indicated by arrows C and D. The head rotating mechanism 73 has a simple construction and an effective structure. Thus, the head 25 can be smoothly and stably rotated by the head rotating mechanism 73. Further, the head rotating mechanism 73 is suitable for a compact cassette recorder.

Further, since the drive lever 72 for moving the head chassis 47 from the stop position to the playback position, and the control lever 86 for switching the head rotating mechanism 48a are both driven by the cam portion 70g of the gear 70, the cam portion 70g determines the relationship between a timing at which the recording/playback head 25 is inserted in the head insertion hole of the cassette half 92 and a timing at which the recording/playback head 25 is rotated. In other words, the cam portion 70g determines the timings at which the recording/playback head 25 is rotated and is then inserted in the cassette half 92. The switching operation is thus smoothly performed. However, if the above timings are disturbed, that is, if the recording/playback head 25 is rotated within the cassette half 92 or if the recording/playback head 25 is inserted in the cassette half 92 while being rotated, the recording/playback head 25 may bump against the head insertion hole of the cassette half 92. As a result, the tape 81, the recording/playback head 25, and the head rotating mechanism 73 may be damaged.

However, since the cam portion 70g determines the above timings, stable and smooth operation can be performed with a simple construction. As a result, the head rotating mechanism can be mass produced. As shown in FIG. 12, since the cam portion 70g is sandwiched between the drive lever 72 and the control lever 86, the forces acting on the side surfaces of the drive lever 72 and the control lever 86 cancel each other. Thus, a loss in the rotational force of the gear 70 is decreased, and hence the motor 58 can be small in size and have low power consumption. Therefore, the head rotating mechanism described above can be used for a compact tape recorder which uses dry cells as its power source.

What we claim is:

1. A tape recorder having a head for recording and playing back a tape,
    forward/reverse switching means for switching from forward tape travel to reverse tape travel at normal speed and vice versa,
    track switching means for supporting and moving said head between positions corresponding to track of the tape in accordance with reverse tape travel and forward tape travel at normal speed; and
    drive means for moving said head into the position where said head corresponds to the track of the tape in accordance with one of reverse tape travel and forward tape travel at normal speed by driving said track switching means in response to a switching operation of said forward/reverse switching means, wherein said drive means includes:
    (a) control means pivotal about a pivot center and receiving a pivotal driving force to pivot said control means about said pivot center in one direction in response to the switching operation of said forward/reverse switching means, said control means having first and second engaging portions respectively disposed at different positions relative to said pivot center;
    (b) control switching means having third and fourth engaging portions at positions respectively opposing said first and second engaging portions of said control means for respective engagement with said first and second engaging portions, said control switching means including (1) support means for supporting said control switching means for (i) rectilinear movement between advanced and retracted positions to permit selective engagement of said third and fourth engaging portions with said first and second engaging portions, respectively, and (ii) pivotal movement in forward and reverse directions about a pivot axis, and (2) moving means for rectilinearly moving said control switching means between said advanced and retracted positions, said control switching means respectively pivoting in said forward or reverse directions in dependence upon its being in said advanced or retracted positions which inturn causes selective respective engagement between said first and second engaging portions and said third and fourth engaging portions in response to said control means pivoting in said one direction; and
    (c) drive slider means operatively interconnecting said control switching means and said track switching means and mounted for reciprocal sliding movement between forward and reverse positions in response to said control switching means pivoting between said forward and reverse directions, respectively, said drive slider means for driving said track switching means to move said head between positions corresponding to tracks of the tape in accordance with forward tape travel and reverse tape travel in dependence upon said drive slider means moving between said forward and reverse positions, respectively.

2. A tape recorder as in claim 1 wherein said moving means further includes lever means having one end operatively engageable with said control switching means and mounted for pivotal movement between first and second positions, and plunger means operatively engaged with the other end of said lever means for moving said lever means between said first and second positions to responsively cause said control switching means to be moved between said advanced and retracted positions, respectively.

3. A tape recorder according to claim 1, further comprising a rotary body which is rotatably driven in response to the switching operation of said forward/reverse switching means, said rotary body including means defining a cam portion.

4. A tape recorder according to claim 3, wherein said control means is engaged with said cam portion of said rotary body and is responsively driven thereby to pivot in said one direction.

5. A tape recorder according to claim 4, further comprising head moving means for supporting said track switching means to permit said head to be movable between contacting and separating positions wherein said head is in contact with and separated from the tape, respectively.

6. A tape recorder according to claim 5, wherein said head moving means includes second drive means for engaging said cam portion of said rotary body and for bringing said head into contact with the tape by virtue of said second drive means being moved by said cam portion.

7. A tape recorder according to claim 6, wherein said control means of said first-mentioned drive means opposes said second drive means of said head moving means through said cam portion of said rotary body.

8. A tape recorder according to claim 7, wherein said means defining a cam portion of said rotary body is shaped and configured to drive said control means in order to rotate said track switching means and then to drive said second drive means in order to move said head moving means.

9. A tape recorder according to claim 1, 3, 4, 5, 6, 7 or 8, wherein said control means includes preventing means having an engaging portion engageable with said drive slider means for preventing sliding movement of said drive slider means when said control means is not driven by said cam portion of said rotary body.

10. A tape recorder as in claim 1 or 2 wherein said moving means further includes movement translation means for translating pivotal movement of said control switching means in said forward and reverse directions into sliding movement of said drive slider means between said forward and reverse positions, respectively.

11. A tape recorder as in claim 10 wherein said movement translation means includes a projection member provided on said control switching means so as to pivot therewith and a pair of spaced-apart drive projections provided on said drive slider means, wherein said projection member selectively engages one of said pair of drive projections in dependence upon said control switching means being pivoted in said forward or reverse directions to thereby respectively move said drive slider means into said forward or reverse positions, respectively.

12. A tape recorder having a head for recording and playing back a tape comprising:
forward/reverse switching means for switching between forward tape travel and reverse tape travel at normal speed;
track switching means for supporting and moving said head between forward and reverse positions corresponding to tracks of the tape in accordance with forward tape travel and reverse tape travel at normal speed; and
drive means for moving said head into a position where said head corresponds to the track of the tape in accordance with one of reverse tape travel and forward tape travel at normal speed by driving said track-switching means in response to a switching operation of said forward/reverse switching means, said drive means including:
(a) control means pivotal in one direction about a pivot center in response to the switching operation of said forward/reverse switching means for controlling movement of said track-switching means between said forward and reverse positions, said control means including means defining first and second engaging portions; and
(b) control switching means operatively interconnecting said control means and said track switching means for selectively translating pivotal movement of said control means in said one direction into movement of said track-switching means to move said head into one of said forward and reverse positions in dependence upon said switching operation of said forward/reverse switching means, said control switching means including (i) means defining third and fourth engaging portions at positions respectively opposable to said first and second engaging portions, (ii) support means for supporting said control switching means for rectilinear movement between advanced and retracted positions to permit respective selective engagement between said first and third engaging portions and between said second and fourth engaging portions, said support means also supporting said control switching means for pivotal movement in forward and reverse directions about a pivot axis, and (iii) moving means for rectilinearly moving said control switching means between said advanced and retracted positions, wherein
said control switching means respectively pivots in said forward or reverse directions in dependence upon its being in said advanced or retracted positions which inturn causes said respective selective engagement between said first and third engaging portions and between said second and fourth engaging portions in response to said control means pivoting in said one direction whereby said head is moved into one of said forward and reverse positions, respectively.

13. A tape recorder as in claim 12 wherein said drive means further includes drive slider means operatively interconnecting said control switching means and said track switching means and mounted for reciprocal sliding movement for driving said track switching means to move said head between said forward and reverse positions in response to said control switching means pivoting between said forward and reverse directions, respectively.

14. A tape recorder as in claim 12 or 13 wherein said moving means further includes lever means having one end operatively engageable with said control switching means and mounted for pivotal movement between first and second positions, and plunger means operatively engaged with another end of said lever means for moving said lever means between said first and second positions to responsively cause said control switching means to be moved between said advanced and retracted positions.

* * * * *